US005606552A

United States Patent [19]
Baldwin et al.

[11] Patent Number: 5,606,552
[45] Date of Patent: *Feb. 25, 1997

[54] BROADBAND ADAPTATION PROCESSING

[75] Inventors: John H. Baldwin, Morristown; Subrahmanyam Dravida, Somerset, both of N.J.

[73] Assignee: Lucent Technologies Inc., Murray Hill, N.J.

[*] Notice: The term of this patent shall not extend beyond the expiration date of Pat. No. 5,481,554.

[21] Appl. No.: 323,958

[22] Filed: Oct. 17, 1994

[51] Int. Cl.$^6$ .......................... H04L 12/56; H04Q 11/04
[52] U.S. Cl. .......................... 370/474; 370/395; 370/472
[58] Field of Search .................. 370/79, 82, 83, 370/99, 102, 60, 60.1, 94.1, 68.1, 110.1, 94.2; 375/200, 205

[56] References Cited

U.S. PATENT DOCUMENTS

| | | |
|---|---|---|
| 4,688,035 | 8/1987 | Gray et al. . |
| 5,050,166 | 9/1991 | Cantoni et al. ........................... 370/82 |
| 5,101,404 | 3/1992 | Kunimoto et al. ........................ 370/60 |
| 5,153,920 | 10/1992 | Danner ................... 370/94.1 |
| 5,214,642 | 5/1993 | Kunimoto et al. ........................ 370/79 |
| 5,363,369 | 11/1994 | Hemmady et al. ....................... 370/60 |
| 5,414,707 | 5/1995 | Johnston et al. ......................... 370/79 |
| 5,481,544 | 1/1996 | Baldwin et al. ...................... 370/110.1 |

OTHER PUBLICATIONS

CCITT, B–ISDN ATM Adaptation Layer (AAL) Functional Description Recommendation 1.362, International Telecommunication Union, Geneva 1991.
CCITT, B–ISDN ATM Adaption Layer (AAL) Specification Recommendation 1.363, International Telecommunication Union, Geneva 1991.

Primary Examiner—Douglas W. Olms
Assistant Examiner—Chau T. Nguyen
Attorney, Agent, or Firm—Jason P. DeMont

[57] ABSTRACT

A method and apparatus for enabling one or more packets (e.g., CDMA packets, CDPD packets etc.) to be encapsulated into a cell (e.g., an ATM cell, a B-ISDN cell) for transmission and/or reception over a broadband network (e.g., an ATM Channel). An illustrative method includes building a basic control octet for a packet of N bytes, the basic control octet including (1) an additional control bit that indicates if a supplemental control octet accompanies the basic control octet, and (2) a length indicator based on N.

10 Claims, 6 Drawing Sheets

BROADBAND ADAPTATION PROCESSING

FIELD OF THE INVENTION

The present invention relates to telecommunications systems, in general, and more particularly to a method and apparatus for transmitting packetized user-data via a broadband network.

BACKGROUND OF THE INVENTION

Figure 1:
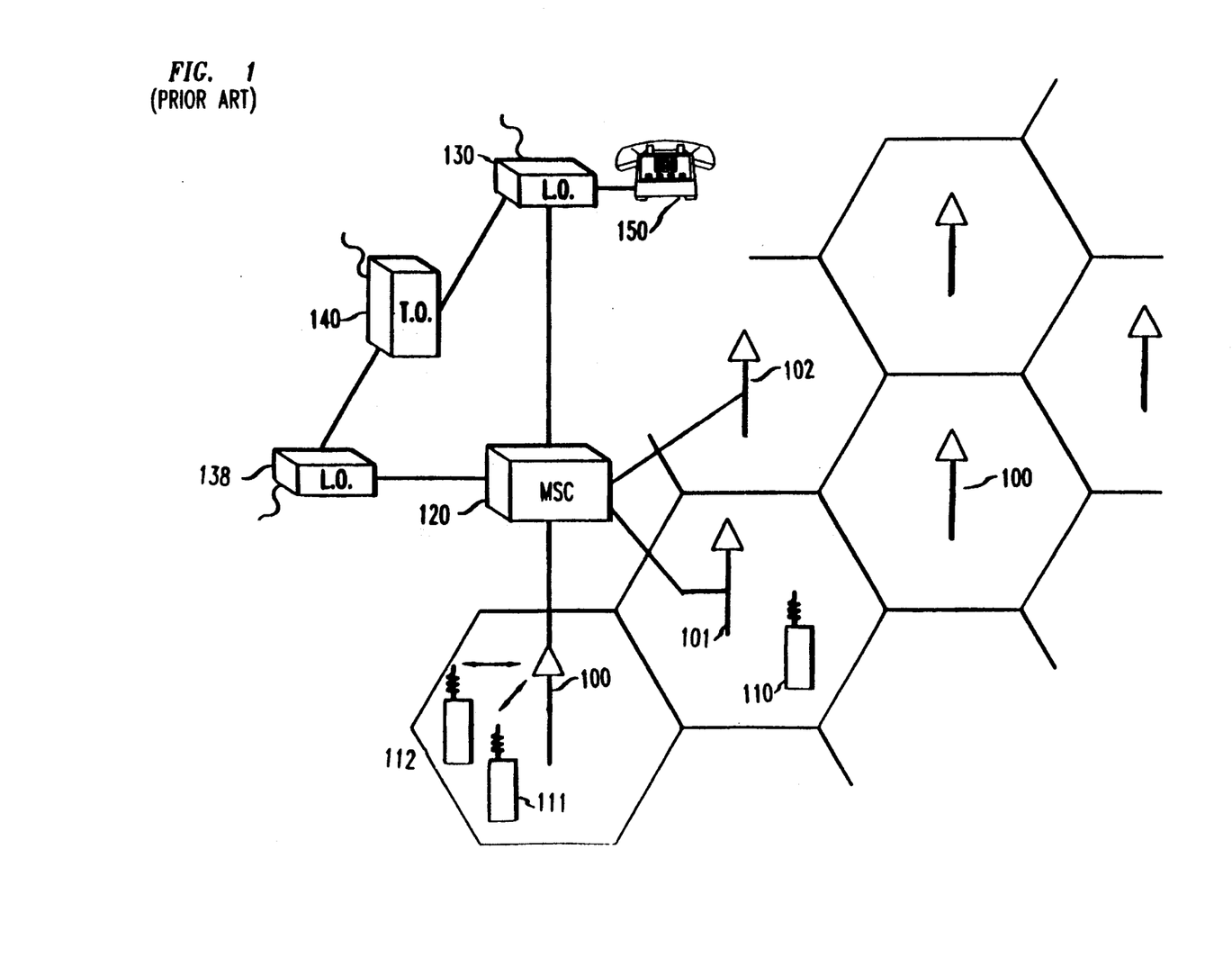
FIG. 1 depicts a schematic diagram of a portion of a typical wireless telecommunications system.

FIG. 1 depicts a schematic diagram of a portion of a typical wireless communications system in the prior art, which system serves a member of wireless terminals that are situated within a geographic area. The heart of a typical wireless system is known as a Mobile Switching Center ("MSC") or, alternatively, as a Mobile Telephone Switching Office ("MTSO"). Typically, the MSC is connected to a number of base stations, which are dispersed throughout the geographic area serviced by the system, and the local and long-distance telephone networks. The MSC is responsible for, among other things, routing or "switching" channels between wireless terminals and between a wireless terminal and a wireline terminal, which is connected to the wireless system via the local and/or long-distance networks.

The geographic area serviced by the wireless system is partitioned into a number of spatially distinct areas called "cells." As depicted in FIG. 1, each cell is schematically represented by a hexagon; in practice, however, each cell usually has an irregular shape that depends on the topology of the terrain serviced by the system. Typically, each cell contains a base station, which comprises the antennas and radios that the base station uses to communicate with the wireless terminals and also comprises the transmission equipment that the base station uses to communicate with the MSC.

For example, when wireless terminal 111 desires to communicate with wireless terminal 112, wireless terminal 111 sends its data to base station 100, which relays the data to MSC 120. Upon receipt of the data, and with the knowledge that it is intended for wireless terminal 112, MSC 120 then returns the data back to base station 100, which relays the data, via radio, to wireless terminal 112. Although it may appear odd that the data must be transmitted from the base station to the MSC only to be returned, it is necessary when base station 100 does not have switching capability. In general, the link between the base station and the MSC carries a great quantity of data, and now that wireless systems are carrying substantially more video and high-speed data than they have in the past, it has become very important for the link to and from the base stations to be capable of efficiently carrying large quantities of data.

SUMMARY OF THE INVENTION

Embodiments of the present invention enable one or more packets (e.g., CDMA packets, CDPD packets, etc.) to be encapsulated in cells (e.g., ATM cells, B-ISDN cells) to be transported over a broadband network.

DETAILED DESCRIPTION

I. Introduction

For pedagogical reasons, the detailed description has been partitioned into five sections. This section provides a broad overview of the exemplary embodiment of the present invention which seeks to efficiently transport packets (e.g., Code Division Multiple Access ("CDMA") packets, Cellular Digital Packet Data packets, etc. ) in larger cells (e.g., asynchronous transfer mode ("ATM") cells via an ATM network) over a broadband network. For pedagogical reasons, the exemplary embodiment encapsulates CDMA size packets into ATM cells. It is understood that embodiments of the present invention can encapsulate any kind and/or size of packet into other kinds of cells.

Section II provides a detailed discussion of the methods and apparatus that the exemplary embodiment uses to encapsulate CDMA packets into ATM cells. Section III provides a detailed discussion of the methods and apparatus that the exemplary embodiment uses to reclaim the CDMA packets from an ATM cell stream.

Some embodiments of the present invention are capable of multiplexing a plurality of CDMA "channels" onto a single ATM virtual circuit. For the purposes of this specification, a channel is defined as a point-to-point uni-directional link in a broadband network (e.g., within an ATM interface between a user/server and a switch, between two switches, between a switch and a cross-connect, or between cross-connects). In the context of ATM and B-ISDN, a channel corresponds to the notion of a virtual channel link ("VCL") or virtual path link ("VPL") as defined in CCITT Recommendation I.113.

The exemplary embodiment can selectively multiplex channels or not multiplex channels, depending on various criteria. Section IV presents a typical example of how four CDMA packets, three of which are associated with one channel and one of which is associated with another channel, are encapsulated by the exemplary embodiment when it does not multiplex the channels; Section V teaches how the same four CDMA packets are encapsulated by the exemplary embodiment when the channels are multiplexed. Section VI presents a hardware apparatus that is capable of both encapsulating the CDMA packets and reclaiming them from an ATM cell stream.

Figure 2:
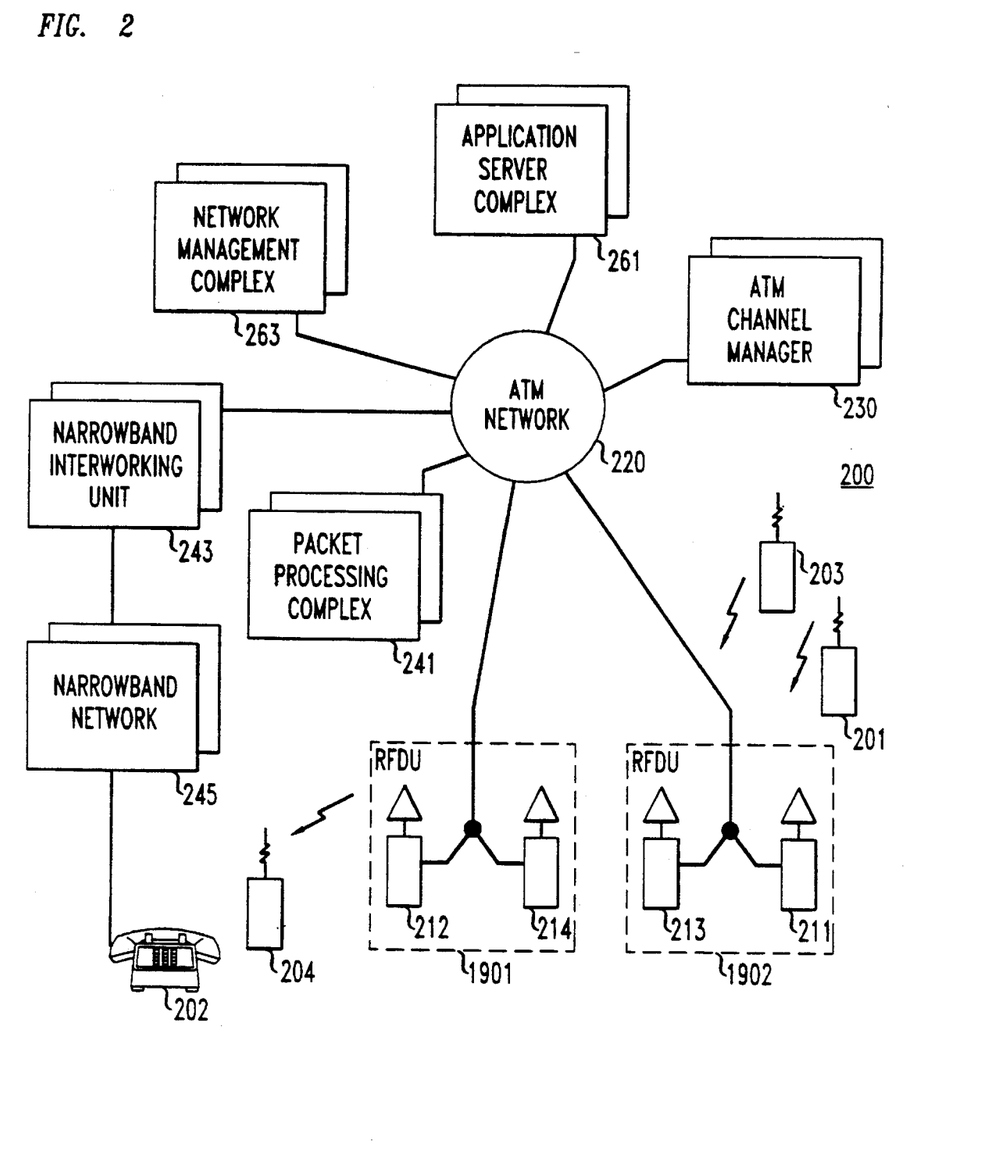
FIG. 2 depicts a schematic diagram of an illustrative embodiment of the present invention, which comprises an ATM-based wireless and wireline telecommunications system.

FIG. 2 depicts a schematic diagram of an illustrative embodiment of the present invention, which uses asynchronous transfer mode ("ATM") technology to transport data between the disparate components of the system (e.g., radio ports, the narrowband internetworking unit, the application server complex, etc.). The disclosure of three U.S. patent applications, all assigned to the assignee of this application are incorporated by reference: (1) Ser. No. 08/323,957, entitled "Broadband Network for Wireless Services," filed Oct. 17, 1994, (2) Ser. No. 08/164,514, entitled "A Signaling System for Broadband Communications Networks," filed Dec. 9, 1993, and (3) Ser. No. 08/164,521, entitled "Direct Signaling System for Narrowband Communications Networks," filed Dec. 9, 1993. Further, the disclosure of D. J. Goodman, U.S. Pat. No. 4,916,691, issued Apr. 10, 1990 is also incorporated by reference.

Figure 3:
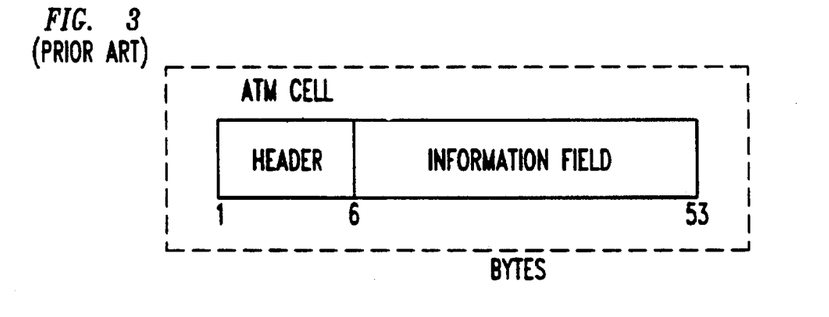
FIG. 3 depicts the format of an ATM cell.

A data network using ATM technology is capable of carrying a 53 byte "cell" from a source to a destination. FIG. 3 depicts the format of an ATM cell. Although an ATM cell is a self-contained electronic message, on one level of abstraction, it can be considered somewhat analogous to a paper postcard that is delivered by the post office. As shown in FIG. 3, the first 5 bytes of the ATM cell is called the "header." The ATM cell header contains the virtual path indicator and virtual circuit indicator ("VPI/VCI") that the ATM network uses to route the cell to its proper destination (i.e., the header is analogous to the written address on the one portion of a postcard). The other 48 bytes of the ATM cell is called the "information field." The information field is the "cargo bay" of the ATM cell and functions as the repository for the user's data (i.e., the information field is analogous to the other portion of the postcard where the sender places whatever data the sender desires the addressee to receive). The book *ISDN and Broadband ISDN. 2nd Ed.* by William Stallings, Macmillan Publishing Company (1992), provides a good background on ATM technology and ATM adaptation layer protocols and is hereby incorporated by reference as if set forth in its entirety.

In wireless communications systems that employ Code Division Multiple Access ("CDMA") technology, or any other packetized data (e.g., CDPD), the data, whether it represents voice, video or data, is relayed between the wireless terminal and the base station via numerous short messages. For the purpose of this specification, these short messages are called. "packets." Insofar as the exemplary embodiment of the present invention interoperates with CDMA technology, the short messages will be called "CDMA packets."

Figure 4:
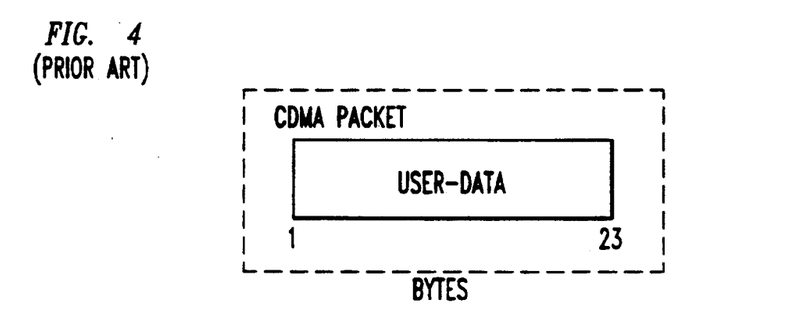
FIG. 4 depicts the maximum size of a CDMA packet.

FIG. 4 depicts a maximum size CDMA packet, which has a variable length of up to 23 bytes. For the purposes of this specification the particular data structure and/or error correction technology that is used for internally formatting the packets is irrelevant. This is true for the same reason that the post office is not hampered by the language that the letter portion of a postcard is written in so long as the post office can read the address portion. The entire packet, however internally formatted, is deemed to constitute "user-data." For information on CDMA technology and the internal formatting of CDMA packets, the reader is referred to Interim Standard 95 (alternatively known as PN-3118 and "IS-95"), which is published by the Telecommunications Industry Association, Washington D.C., and is hereby incorporated by reference as if set forth in its entirety.

As stated previously, the exemplary embodiment preferably transmits and/or receives CDMA packets via an ATM network. Unfortunately, the encapsulation of a single CDMA packet into a single ATM cell information field leaves a substantial portion of the capacity of the ATM cell unused (at least 25 bytes), and, thus, wastes a substantial portion of the bandwidth capacity of the ATM network. Therefore, the exemplary embodiment of the present invention seeks to transmit and/or receive CDMA packets via ATM networks more efficiently than just one CDMA packet per ATM cell.

To accomplish this, the exemplary embodiment communicates using an ATM adaptation layer ("AAL") protocol. There are five AALs that have been standardized by the CCITT Recommendation I.113, which is incorporated by reference as if set for in its entirety. Furthermore, M. Kunimoto et al., U.S. Pat. No. 5,101,404, issued Mar. 31, 1992, teaches another AAL, called "AAL5." The five CCITT AALs and Kunimoto teach techniques for segmenting "large packets" (i.e., packets which are typically larger than the cells) and distributing the parts among several ATM cells in such a way that, at the destination, the various parts can be reclaimed and reassembled to reconstitute the packet. Because of the functionality they provide, each of these techniques constitute what are known as a Segmentation and Reassembly Sublayer protocols.

In contrast, the exemplary embodiment does not attempt to partition large packets among multiple cells, but attempts to efficiently stuff multiple "small packets" (i.e., packets which are typically smaller than the cells) into a single ATM cell. For this reason, the exemplary embodiment communicates via what can be called an "Aggregation and Disassembly protocol."

It is understood that the exemplary embodiment is capable of handling both fixed and variable-length packets of up to 64 bytes, without modification. In circumstances where the exemplary embodiment is not capable of handling packets without modification, it will be clear from the present disclosure how the exemplary embodiment can be modified so that other packetized data can be handled.

II. The Methodology for Encapsulating CDMA Packets into ATM Cells

Figure 5:
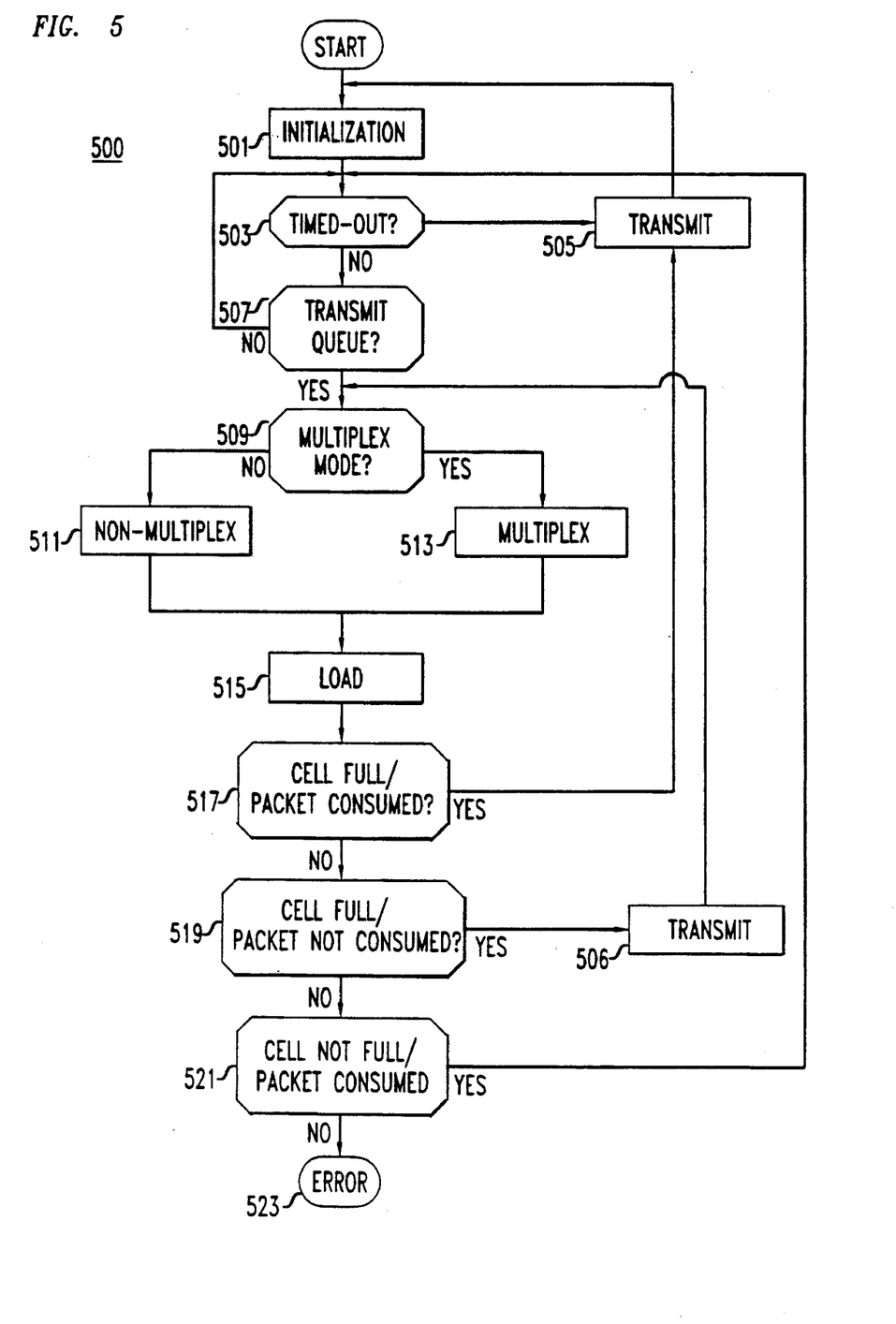
FIG. 5 depicts a flowchart of an illustrative method that can be used to pack the packets into the cells in accordance with the exemplary embodiment.

FIG. 5 depicts a flowchart of the exemplary embodiment of the present invention that is suitable for implementation either in custom hardware or as programmed instructions in a general purpose computer. It is understood that the generalized technique depicted in FIG. 5 can be implemented in custom hardware, as an appropriately programmed general purpose processor, or as a combination of the two. When custom hardware is used, it is understood that many of the depicted operations and tests can be parallelized. Further, it is understood that many of the depicted operations and tests can be implemented with a combination of hardware and software (e.g., by using an appropriately programmed general purpose processor that is connected, via an interrupt manager, to hardware timers, etc.).

The exemplary embodiment of the present invention has a selective multiplexing capability, which enables multiple "channels" to be carried via a single virtual circuit. During the set-up of a channel, ATM channel manager 230 preferably decides whether the channel is to be multiplexed with other channels, and if so, which ones. Alternatively, ATM channel manager 230 can decide that one or more channels are not to be multiplexed. The decision of whether to multiplex channels or not can depend, for example, on empirical or desired traffic engineering criteria, the type of data on the channel and the priority of the user's data.

When ATM channel manager 230 decides not to multiplex a channel, the channel is unambiguously identified by the ATM network source (e.g., base station 211) and destination (e.g., packet processing complex 241 or narrowband interworking unit 243) by a unique virtual circuit identifier ("VCI") that is associated with the channel. The association of a given channel with a particular VCI is preferably done by ATM channel manager 230.

In contrast, when ATM channel manager 230 decides that a given channel should be multiplexed, it becomes impossible, without more, for the ATM network destination to distinguish the respective channels associated with a single VCI. To remedy this, when ATM channel manager 230 decides to multiplex a channel, it assigns a "virtual channel" identifier to the channel. The virtual channel identifier is different than the virtual channel identifier given to the other channels with which it is multiplexed. In the exemplary embodiment, eight channels can be multiplexed onto a single VCI, and, therefore, the virtual channel identifiers will be designated as 1–8. ATM channel manager 230 then notifies the essential components in system 200 (typically, the ATM network source and destination of the channel) of the VCI associated with the channel, and whether the channel is to be multiplexed, and, if so, what its virtual channel identifier is.

Referring to FIG. 2, in base station 211, CDMA packets arrive sporadically from the various wireless terminals and are preferably sorted according to their associated VCI and queued for transmission via ATM network 220 to their respective destination. It is preferred that each component in system 200 that encapsulates CDMA packets into ATM cells comprise a first-in first-out ("FIFO") queue (not shown) for each VCI to hold the CDMA packets while they are awaiting transmission. In other words, there should be one transmit queue for each VCI. Table 1. depicts the logical structure of the exemplary transmit queue in accordance with the present invention.

TABLE 1

Transmit Queue Data Structure for One Virtual Channel

| Queue Position | Virtual Channel ID | Packet Length | User-data |
| --- | --- | --- | --- |
| n | | | |
| n+1 | | | |
| n+2 | | | |
| ... | | | |
| n+k | | | |

Referring again to FIG. 5, the flowchart depicts a technique that can be used by any component in system 200 to encapsulate CDMA packets prior to their transmission via ATM network 220. The technique preferably begins with an "initialization operation" (block 501), which conceptually prepares a new, empty ATM cell. Because the queued packets can, under some circumstances, be perishable, the initialization operation (block 501) preferably starts a timer (not shown) that is used to help assure that no packets go stale (i.e., meet system timing requirements) just because the system is waiting for other packets to arrive to be packed with it. In other words, because of the stochastic arrival rate of the packets, there is an inherent trade-off to be made between bandwidth efficiency and latency. The timer is used to affect where on this trade-off the embodiment is to operate.

From the initialization operation (block 501), control passes to the "timed-out" test (block 503) which tests how old the current partially constructed ATM cell is. The length of time used to trip the timed-out test can be set depending on the type of information being sent (e.g., video, audio, data), on the perishability of the information, and on the priority of the information. If the timed-out test (block 503) determines that the current ATM cell is in danger of going stale, then control passes to the "transmit operation" (block 505); otherwise, control passes to the "transmit queue" test (block 507).

If the current ATM cell contains any user-data in its information field, the transmit operation (block 505) preferably pads the remainder of the ATM cell with filler and then transmits it via ATM network 220. The unused portion of the ATM payload can be padded with copies of the first basic control octet. If there is no user-data in the information field of the current ATM cell, the transmit operation can just discard the ATM cell shell without transmitting anything. From the transmit operation (block 505), control passes back to the initialization operation (block 501). It is understood that alternatively, control can pass from the transmit operation (block 505) to the transmit queue test (block 507).

The transmit queue test (block 507) checks to see whether there is a CDMA packet in the transmit queue. If there is, then the CDMA packet is taken from the queue and control passes to the "multiplexed mode" test (block 509); otherwise control passes back to the timed-out test (block 503).

The multiplexed mode test (block 509) checks whether the VCI associated with the respective queue is currently operating in multiplexed or non-multiplexed mode. If it currently in operating in multiplexed mode, control passes to the "multiplexed" operation (block 513); otherwise control passes to the "non-multiplexed" operation (block 511).

The task of both the multiplexed operation (block 513) and the non-multiplexed operation (block 511) is preferably to construct a linear data structure in the ATM cell information field that permits both (1) the encapsulation of multiple CDMA packets within a single ATM cell, and (2) of bifurcating a packet such that its constituents can be carried in successive ATM cells (i.e., across ATM cell "boundaries"). Both the multiplexed operation (block 513) and the non-multiplexed operation (block 511) accomplish this task by creating one or more "control octets." In the exemplary embodiment, there are two types of control octets, called "Control Octet #1" ("CO1") and "Control Octet #2" ("CO2").

When the respective virtual channel is in non-multiplexed mode, only Control Octet #1 is used; otherwise, the data structure comprises Control Octet #1 and Control Octet #2, adjacent to each other, in pairs. The information field of an ATM cell can comprise one or more Control Octet #1s interposed by CDMA packets or one or more pairs of Control Octet #1 and Control Octet #2, also interposed between CDMA packets.

Figure 6:
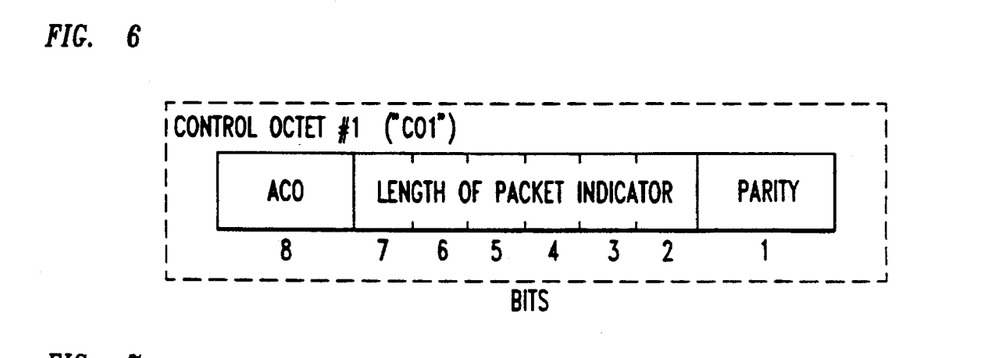
FIG. 6 depicts the format of a Control Octet #1.
Figure 7:
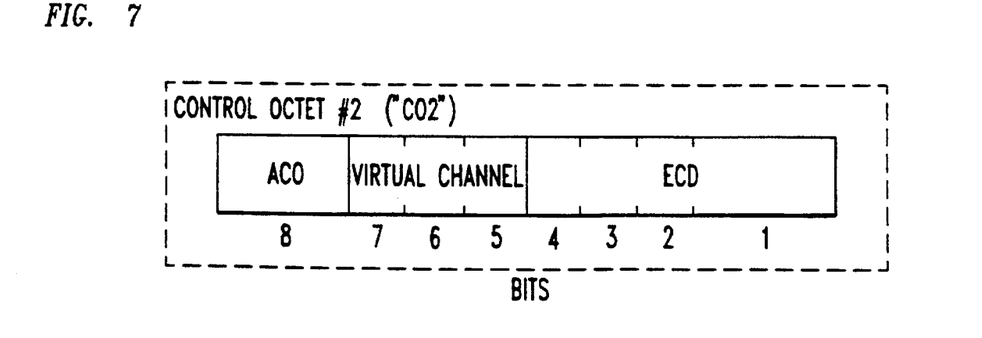
FIG. 7 depicts the format of a Control Octet #2.

Each control octet comprises eight bits. The format of Control Octet #1 is depicted in FIG. 6; the format of Control Octet #2 is depicted in FIG. 7. Control Octet #1 advantageously contains three fields, which can be in any order, but which preferably are as shown in FIG. 6. In the exemplary embodiment, the information field of an ATM cell always begins with a Control Octet #1, which serves as the landmark for the data structure and permits the unambiguous parsing of the information field by the receiver. If the VCI is in multiplexed mode, the next byte after Control Octet #1 is always Control Octet #2.

Reading from left to right, Control Octet #1 preferably comprises: (1) the "additional control octet" or "ACO" field of one bit, (2) the "packet length" or "PL" field of six bits, and (3) a parity field of one bit. When the ACO bit is asserted, it indicates that the next byte in the information field is a Control Octet #2. Because Control Octet #2 is advantageously only used in multiplexed operation, the ACO bit can serve as check by the receiver that the ATM cell holds packets in multiplexed mode. But because the receiver should have been informed of this already by call management server 220, the bit can be used for another purpose, such as to extend the length of the packet length field or for more error detection and/or correction.

The packet length field indicates the length of the CDMA packet following the control octets, regardless of whether Control Octet #2 is present or not. In this way, the packet length field permits the receiver to correctly parse the end of the instant CDMA packet from the next Control Octet #1. The parity field contains a bit which represents the parity of the entire control octet and is used for error detection.

Referring to FIG. 7 and reading from left to right, Control Octet #2 preferably comprises: (1) the "additional control octet" or "ACO" field of one bit, (2) the "virtual channel ID" field of three bits, and (3) the "error correction and detection" or "ECD" field of four bits. When the ACO bit is asserted, it indicates that the next byte in the information field is a Control Octet #3. The existence of additional control octets, e.g., Control Octet #3, Control Octet #4, etc., provide a mechanism for multiplexing more than eight channels onto a single virtual circuit. It is preferred that additional control octets have the same format as Control Octet #2.

The virtual channel ID field preferably indicates which virtual channel the adjacent CDMA packet is to be associated with by the receiver. The ECD field preferably provides four bits which provide for error correction and/or detection of the data within Control Octet #2.

Referring back to FIG. 5, the non-multiplexed operation (block 511) constructs Control Octet #1 for the CDMA packet that was just removed from the queue and puts it in the next available location in the information field of the current ATM cell. Then control passes to the load operation (block 515). The multiplexed operation (block 513) constructs both Control Octet #1 and Control Octet #2 for the CDMA packet that was just removed from the queue and puts them both in the next available locations in the information field of the current ATM cell. Then control passes to the "load operation" (block 515).

The load operation (block 515) puts the CDMA packet, or so much of it as will fit, into the information field of the current ATM cell; and passes control to the "cell full/packet consumed" test (block 517). It should be understood that the cell becomes "full" when its information field comprises 48 bytes.

The cell full/packet consumed test (block 517) checks to see if the current ATM cell is full and that all of the last CDMA packet fit into the ATM cell. If the condition is true, then control passes to the transmit operation (block 505); otherwise, control passes to the "cell full/packet not consumed" test (block 519).

The cell full/packet not consumed test (block 519) checks to see if the current ATM cell is full and that some of the last CDMA packet did not fit into the ATM cell. If the condition is true, then control passes to the transmit operation (block 506); otherwise control passes to the "cell not full/packet consumed" test (block 521). The transmit operation (block 506) performs exactly the same function as the transmit operation (block 505) except that afterwards control passes to the multiplex mode test (block 509).

The cell not full/packet consumed test (block 521) checks to see if the current ATM cell is not full and that all of the last CDMA packet did fit into the ATM cell. If the condition is true, then control passes to the timed-out test (block 503); otherwise an error condition has occurred and control passes to an error trap (block 523).

III. The Methodology for Reclaiming CDMA Packets from an ATM Cell Stream

Figure 8:
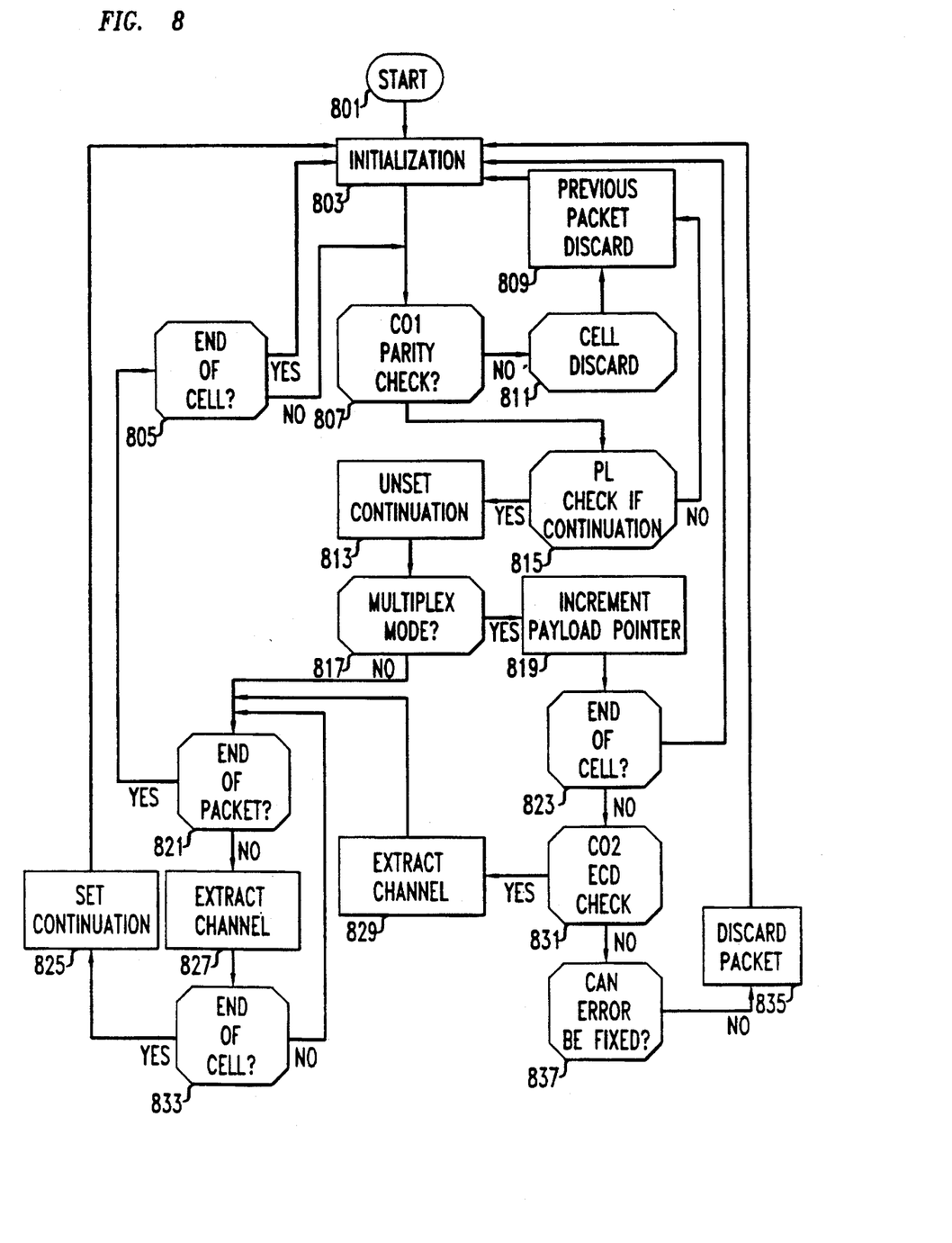
FIG. 8 depicts a flowchart of an illustrative method that can be used to reclaim packets from an ATM cell stream, which packets have been encapsulated in accordance with the exemplary embodiment.

FIG. 8 depicts a flowchart of an illustrative method that can be used to reclaim packets from an ATM cell stream, which packets have been encapsulated in accordance with the exemplary embodiment. It is understood that the generalized technique depicted in FIG. 8 can be implemented in custom hardware, as an appropriately programmed general purpose processor, or as a combination of the two. When custom hardware is used, it is understood that many of the depicted operations and tests can be parallelized. Further, it is understood that many of the depicted operations and tests can be implemented with a combination of hardware and software (e.g., by using an appropriately programmed general purpose processor that is connected, via an interrupt manager, to hardware timers, etc.).

As shown in FIG. 2, the exemplary embodiment of the present invention advantageously receives a stream of ATM cells from ATM network 220. Upon receipt of the ATM cells, it is preferred that they be are sorted by VCI and put into VCI-distinct FIFO queues to await processing by the technique shown in FIG. 8. Then, operating advantageously on one queue at a time (at least logically), the illustrative method depicted in FIG. 8 takes the ATM cells from the queue and reclaims the encapsulated CDMA packets.

Referring again to FIG. 8, the technique preferably begins with the "start operation" (block 801), which sets the flag "continuation" to binary "false". From the start operation (block 801) control passes to the "initialization operation" (block 803), which (1) resets a pointer called "atmpayload" to 1; and (2) takes an ATM cell (the "current" ATM cell) from the FIFO queue. From the initialization operation (block 803) control passes to the "CO1 parity check" test (block 807), which retrieves the next Control Octet #1 from the information field of the ATM cell and checks to assure that the parity is correct. If the parity is correct, then control passes to the "packet length if continuation" test (block 815); otherwise control passes to the "cell discard" operation (block 811).

The cell discard operation (block 811) preferably discards the current ATM cell and directs that the first packet in the next ATM cell also be discarded. From the cell discard operation, control passes to the "previous packet discard" operation (block 809). The previous packet discard operation (block 809) determines if the current ATM cell was to contain a latter portion of a packet whose initial portion was transmitted in the previous ATM cell. If it is, then the previous packet discard operation (block 809) discards the most previously reclaimed packet; otherwise the operation does nothing. From the previous packet discard operation (block 809) control passes back to the initialization operation (block 803).

The packet length if continuation test (block 815) checks if the flag continuation is true and verifies that the remainder of the packet length is correct. If the test is true, then control passes to the "unset continuation" operation (block 813); otherwise control passes to the previous packet discard operation (block 809). The unset continuation operation (block 813) both (1) sets the continuation flag to false, and (2) sets the variable "packet_length" to the contents of the CO1 packet length field. From the unset continuation operation (block 813) control passes to the "multiplex mode" test (block 817). The multiplex mode test (block 817) tests if the current ATM cell was constructed in multiplex mode. This can be determined by testing if the ACO bit of CO1 is asserted. If it is (meaning multiplexed operation is invoked) then control passes to the "increment payload pointer" operation (block 819); otherwise (meaning multiplexed operation is not invoked) then control passes to the "end of packet" test (block 821).

The increment payload pointer operation (block 819) increments by one the contents of the atmpayload pointer and then passes control to the "first end of cell" test (block 823). The first end of cell test (block 823) determines if the atmpayload pointer equals 49. If it does, then control passes to the initialize operation block (803); otherwise control passes to the "CO2 ECD check" test (block 831). The CO2 ECD check (block 831) tests the integrity of the CO2 octet based on the contents of the ECD field and the appropriate error correction/detection technique used during encoding. If the CO2 ECD check (block 831) confirms the integrity of the CO2 octet, then control passes to the "extract channel" operation (block 829); otherwise control passes to the "reclaimable error" test (block 837).

The extract channel operation (block 829) sets a variable "channel" equal to the contents of the virtual channel field of CO2 and passes control to the end of packet test (block 821 ). The reclaimable error test (block 837) determines if the integrity of the CO2 can be restored. If it can, control passes to the extract channel operation (block 829); otherwise control passes to the "discard packet" operation (block 835). The discard packet operation discards the packet currently being extracted and passes control to the initialization operation (block 803).

The end of packet test (block 821) tests if the contents of the variable packet_length is equal to zero. If it is, then control passes to the "second end of cell" test (block 805); otherwise control passes to the "extract data" operation (block 827). The second end of cell test (block 805) determines if the atmpayload pointer equals 49. If it does, then control passes to the initialization operation (block 803); otherwise control passes to the CO1 parity check test (block 807). The extract data operation (block 827) (1) extracts a byte from the ATM cell information field pointed to by the atmpayload pointer, (2) increments by one the atmpayload pointer, and (3) decrements by one the packet_length variable. The extracted byte is a part of the reclaimed CDMA packet.

The extract data operation (block 827) then passes control to the "third end of cell" test (block 833). The third end of cell test determines if the atmpayload pointer equals 49. If it does, then control passes to the "set continuation" operation (block 825); otherwise control passes back to the end of packet test (block 821). The set continuation operation (block 825) sets the continuation flag to true if, and only if, the variable packet_length equals zero. The set continuation operation (block 825) then passes control back to the initialize operation (block 803).

IV. An Illustrative Example Using Non-Multiplexed Conversations

For pedagogical purposes, the section details an example of how the exemplary embodiment of the present invention encapsulates multiple non-multiplexed channels between four users. This section details how the exemplary embodiment encapsulates the same channels but by using multiplexing.

Referring to FIG. 2, the example is that one user, Alice, using wireless terminal 201, is having a first channel with a second user Bill, using wireline terminal 202, and desires to transmit to Bill the 60 byte ASCII encoded message "The fault, dear Bill, is not in our stars, but in ourselves." During call set-up between Alice and Bill, ATM channel manager 230 decided not to multiplex their channel and, therefore, assigned the channel a unique VCI. In the examples below, the values of the ATM cell headers will be zero. It will be clear to those skilled in the art how to populate the headers with appropriate values. Further, the exemplary embodiment will use even parity to populate the CO1 parity bit.

Because wireless terminal 201 communicates with radio port 211 using CDMA, the ASCII message from Alice is segmented by wireless terminal 201 and transmitted in three CDMA packets, as shown in Table 2.

TABLE 2

Alice's message to Bill

| | |
|---|---|
| CDMA Packet #1 (23 bytes) | The_fault,_dear_Bill,_i |
| CDMA Packet #2 (23 bytes) | s_not_in_our_stars,_but |
| CDMA Packet #3 (13 bytes) | _in_ourselves. |

At approximately the same time that Alice is sending her message to Bill, a third user, Chuck, using wireless terminal 203, is using a channel with a fourth user, Dave, using wireless terminal 204, and desires to transmit to Dave the 13 byte ASCII encoded message: "Et tu, Brute?" which is contained within a single CDMA packet as shown in Table 3. During call set-up between Chuck and Dave, ATM channel manager 230 decided not to multiplex their channel with Alice and Bill's and, therefore, assigned the channel a unique VCI.

TABLE 3

Chuck's message to Dave

| | |
|---|---|
| CDMA Packet #1 (13 bytes) | Et_tu,_Brute? |

Because the packets in the channel between Alice and Bill have a different VCI than the channel between Chuck and Dave, the exemplary embodiment encapsulates the three CDMA packets from Alice into two successive ATM cells, as shown in Tables 4 and 5, respectively. The 53 bytes of an ATM cell are depicted in the tables showing the hexadecimal codes comprising the ATM cell in the first four columns. For space and pedagogical reasons, the ATM cell is shown four bytes per line, which is why there are three shaded squares. The fifth column of the table provides a correlative explanation for the data in the first four columns.

TABLE 4

ATM Cell #1 of the channel between Alice and Bill.

| | | | | |
|---|---|---|---|---|
| 00 | 00 | 00 | 10 | four bytes of ATM cell header |
| A5 | 2E | 54 | 68 | one byte of ATM cell header; CO 1; user-data "Th" |
| 65 | 20 | 66 | 61 | user-data "e_fa" |
| 75 | 6C | 74 | 2C | user-data "ult," |
| 20 | 64 | 65 | 61 | user-data "_dea" |
| 72 | 20 | 42 | 69 | user-data "r_Bi" |
| 6C | 6C | 2C | 20 | user-data "ll,_" |
| 69 | 2E | 73 | 20 | user-data "i"; CO1; user-data "s_" |
| 6E | 6F | 74 | 20 | user-data "not_" |
| 69 | 6E | 20 | 6F | user-data "ur_s" |
| 75 | 72 | 20 | 73 | user-data "ur_s" |
| 74 | 61 | 72 | 73 | user-data "tars" |
| 2C | 20 | 62 | 75 | user-data ",_bu" |
| 74 | | | | user-data "t" |

TABLE 5

ATM Cell #2 of the channel between Alice and Bill.

| | | | | |
|---|---|---|---|---|
| 00 | 00 | 00 | 10 | four bytes of ATM cell header |
| 65 | 20 | 66 | 61 | one byte of ATM cell header; CO1; user-data "_i" |
| 6E | 20 | 6F | 75 | user-data "n_ou" |
| 72 | 73 | 65 | 6C | user-data "rsel" |

TABLE 5-continued

ATM Cell #2 of the channel between Alice and Bill.

| 76 | 65 | 73 | 2E | user-data "ves." |
|----|----|----|----|------------------|
| 00 | 00 | 00 | 00 | 4 padding bytes |
| 00 | 00 | 00 | 00 | 4 padding bytes |
| 00 | 00 | 00 | 00 | 4 padding bytes |
| 00 | 00 | 00 | 00 | 4 padding bytes |
| 00 | 00 | 00 | 00 | 4 padding bytes |
| 00 | 00 | 00 | 00 | 4 padding bytes |
| 00 | 00 | 00 | 00 | 4 padding bytes |
| 00 | 00 | 00 | 00 | 4 padding bytes |
| 00 |    |    |    | 1 padding byte |

Table 6 shows how the exemplary embodiment encapsulates the CDMA packet sent from Chuck.

TABLE 6

The ATM Cell of the channel between Chuck and Dave.

| 00 | 00 | 00 | 20 | four bytes of ATM cell header |
|----|----|----|----|-------------------------------|
| B5 | 1B | 45 | 74 | one byte of ATM cell header; CO1; user-data "Et" |
| 20 | 74 | 75 | 2C | user-data "_tu," |
| 20 | 42 | 72 | 75 | user-data "_Bru" |
| 74 | 65 | 3F | 00 | user-data "te?" 1 padding byte |
| 00 | 00 | 00 | 00 | 4 padding bytes |
| 00 | 00 | 00 | 00 | 4 padding bytes |
| 00 | 00 | 00 | 00 | 4 padding bytes |
| 00 | 00 | 00 | 00 | 4 padding bytes |
| 00 | 00 | 00 | 00 | 4 padding bytes |
| 00 | 00 | 00 | 00 | 4 padding bytes |
| 00 | 00 | 00 | 00 | 4 padding bytes |
| 00 |    |    |    | 1 padding byte |

V. An Illustrative Example With Multiplexed Conversations

This example is precisely the same as that proposed in Section IV except that during call set-up between Alice and Bill, ATM channel manager 230 decide to multiplex their channel and, therefore, assigns the channel a unique VCI and a virtual channel ID of "3." Also different is that during call set-up between Chuck and Dave, ATM channel manager 230 decides also to multiplex their channel on the same VCI as Alice and Bill's. ATM channel manager 230 assigns Chuck's and Dave's channel a virtual channel ID of "7."

As shown in Table 7 in the example, base station 211 received the four CDMA packets in the following order: CDMA Packet #1 from Alice, CDMA Packet #1 from Chuck, CDMA Packet #2 from Alice and CDMA Packet #3 from Alice. Because of the packets share the same VCI, they are put into a single FIFO queue for transmission.

TABLE 7

The Transmit Queue

| Queue Position | Virtual Channel ID | Packet Length | User-data |
|----------------|--------------------|--------------:|-----------|
| 1 | 3 | 23 | The_fault,_dear_Bill,_i |
| 2 | 7 | 13 | Et_tu,_Brute? |
| 3 | 3 | 23 | s_not_in_our_stars,_but |
| 4 | 3 | 14 | _in_ourselves. |

Assuming that there are no other CDMA packets to be transmitted on the same VCI, the four CDMA packets shown in the Transmit Queue of Table 8 are encapsulated into two successive ATM cells as shown in Tables 8 and 9. Note that all of the examples use repeating of the VCID in the lower nibble of CO2 for ECD.

TABLE 8

ASTM Cell #1.

| 00 | 00 | 00 | 00 | four bytes of ATM cell header |
|----|----|----|----|-------------------------------|
| 55 | AF | 33 | 54 | one byte of ATM cell header; CO1; CO2; user-data "T" |
| 68 | 65 | 20 | 66 | user-data "he_f" |
| 61 | 75 | 6C | 74 | user-data "ault" |
| 2C | 20 | 64 | 65 | user-data ",_de" |
| 61 | 72 | 20 | 42 | user-data "ar_B" |
| 69 | 6C | 6C | 2C | user-data "ill," |
| 20 | 69 | 9A | 77 | user-data "_i"; CO1; CO2 |
| 45 | 74 | 20 | 74 | user-data "Et_t" |
| 75 | 2C | 20 | 42 | user-data "u,_B" |
| 72 | 75 | 74 | 65 | user-data "rute" |
| 3F | 8D | 33 | 73 | user-data "?"; CO1; CO2; user-data "s" |
| 20 | 6E | 6F | 74 | user-data "_not" |
| 20 |    |    |    | user-data "_" |

TABLE 9

ATM Cell #2.

| 00 | 00 | 00 | 00 | four bytes of ATM cell header |
|----|----|----|----|-------------------------------|
| 55 | A3 | 33 | 69 | one byte of ATM cell header; CO1; CO2; user-data "i" |
| 6E | 20 | 6F | 75 | user-data "n_ou" |
| 72 | 20 | 73 | 74 | user-data "r_st" |
| 61 | 72 | 73 | 2C | user-data "ars," |
| 20 | 62 | 75 | 74 | user-data "_but" |
| 9C | 33 | 20 | 69 | CO1; CO2; user-data "_i" |
| 6E | 20 | 6F | 75 | user-data "n_ou" |
| 72 | 73 | 65 | 6C | user-data "rsel" |
| 76 | 65 | 73 | 2E | user-data "ves." |
| 00 | 00 | 00 | 00 | 4 padding bytes |
| 00 | 00 | 00 | 00 | 4 padding bytes |
| 00 | 00 | 00 | 00 | 4 padding bytes |
| 00 |    |    |    | 1 padding byte |

It is apparent from the above examples that multiplexing permits the four CDMA packets to be transmitted in two ATM cells, instead of the three ATM cells required when multiplexing is not invoked.

VI. A Hardware System

Figure 9:
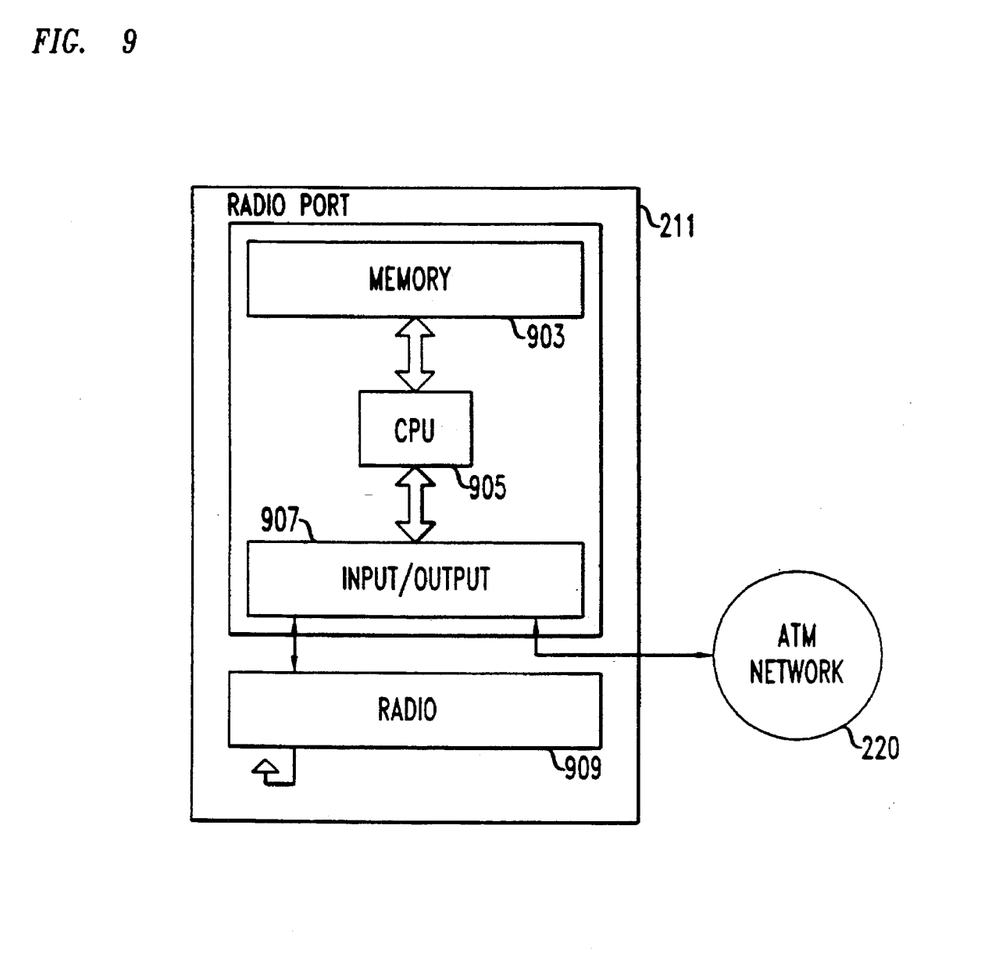
FIG. 9 depicts a hardware implementation of the exemplary embodiment.

FIG. 9 depicts a schematic drawing of an illustrative radio port that is capable of encapsulating CDMA packets into ATM cells in accordance with the exemplary embodiment, and is also capable of reclaiming CDMA packets from an ATM cell stream, which packets were encapsulated in accordance with the exemplary embodiment. It should be understood that embodiments of the present invention will be found in all those network elements which either initiate or terminate the AAL associated with the present invention.

Radio port advantageously comprises: central processing unit ("CPU") 905, input/output circuitry 907, memory 903 and radio 909. It is preferred that memory 903 contain procedures for implementing the procedures described above with respect to FIGS. 5 and 8. It is will be clear to those skilled in the art how to code these procedures from the above disclosure.

It is understood that the above described embodiments are merely illustrative of the application of principles of the invention and that other arrangements may be devised without departing from the spirit and scope of the invention.

What is claimed is:

1. A method for generating a cell payload based on a user packet comprising N octets (where N is a positive integer), said method comprising:

building a basic control octet which comprises:
  (1) an additional control bit that indicates if a supplemental control octet accompanies said basic control octet, and
  (2) a length indicator based on N;

packing said basic control octet and said user packet into said cell payload; and padding any unused portion of said cell payload with copies of said basic control octet.

2. A method for generating a cell payload based on a first user packet comprising M octets (where M is a positive integer) and a second user packet comprising N octets (where N is a positive integer), said method comprising:

building a first basic control octet which comprises:
  (1) an additional control bit that indicates if a first supplemental control octet accompanies said first basic control octet,
  (2) a length indicator based on M;

building a second basic control octet which comprises:
  (1) an additional control bit that indicates if a second supplemental control octet accompanies said first basic control octet,
  (2) a length indicator based on N; and packing said first basic control octet, said first user packet, said second basic control octet and said second user control packet into said cell payload.

3. The method of claim 2 wherein:

said first basic control octet further comprises a parity bit based on said additional control bit and said length indicator M, and said second basic control octet further comprises a parity bit based on said additional control bit and said length indicator N.

4. The method of claim 2 wherein said step of packing further comprises concatenating said first basic control octet, said first user packet, said second basic control octet and said second user control packet.

5. The method of claim 4 wherein said step of packing further comprises aligning said first basic control octet, said first user packet, said second basic control octet and said second user control packet with a boundary of said cell payload.

6. The method of claim 5 further comprising the step of padding any unused portion of said cell payload with copies of said first basic control octet and said second basic control octet.

7. A method for generating a cell payload based on a user packet, which is associated with a logical link Q and which comprises N octets (where N is a positive integer), said method comprising:

building a basic control octet that comprises:
  (1) an additional control bit that indicates if a supplemental control octet accompanies said basic control octet, and
  (2) a length indicator based on N;

building a supplemental control octet that comprises:
  (1) an additional control bit that indicates if an ancillary control octet accompanies said supplemental control octet, and
  (2) a logical link indicator based on Q;

packing said basic control octet, said supplemental control octet and said user packet into said cell payload.

8. The method of claim 7 wherein:

said basic control octet further comprises a parity bit based at least on said length indicator; and said supplemental control octet further comprises a redundancy field based at least on said logical link indicator.

9. The method of claim 7 wherein said step of packing further comprises:

concatenating said basic control octet, said supplemental control octet and said user packet; and aligning said basic control octet, said supplemental control octet and said user packet with a boundary of said cell payload.

10. The method of claim 9 further comprising the step of padding any unused portion of said cell payload with copies of said basic control octet and said supplemental control octet.

* * * * *